J. V. SCHMID.
VALVE.
APPLICATION FILED MAY 11, 1910.
1,033,121. Patented July 23, 1912.
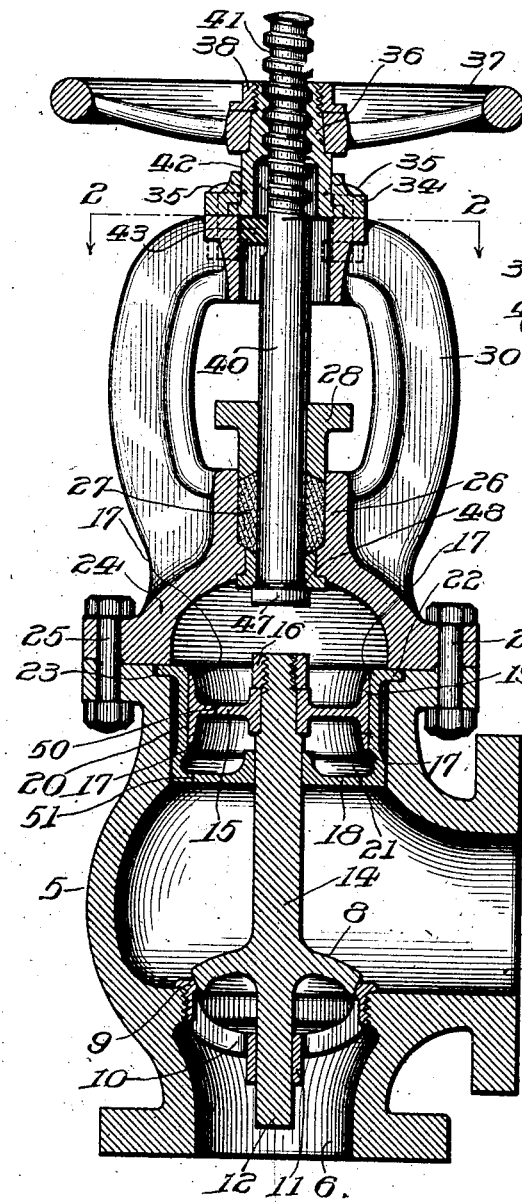
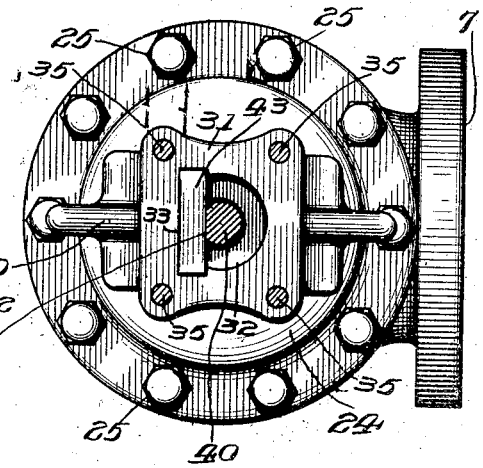
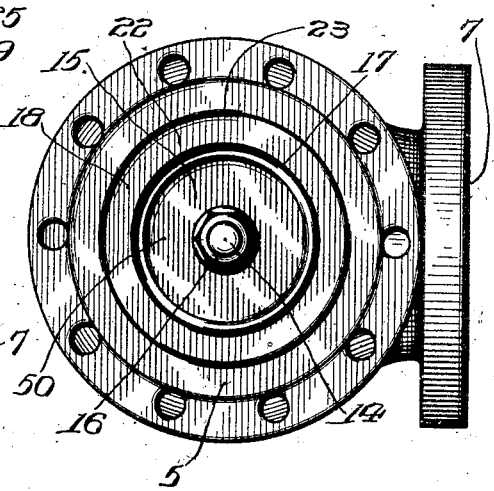
INVENTOR
John V. Schmid.
WITNESSES
BY
ATTORNEY

UNITED STATES PATENT OFFICE.

JOHN V. SCHMID, OF WYNDMOOR, PENNSYLVANIA, ASSIGNOR TO NELSON VALVE COMPANY, A CORPORATION OF PENNSYLVANIA.

VALVE.

1,033,121.  Specification of Letters Patent.  Patented July 23, 1912.

Application filed May 11, 1910. Serial No. 560,677.

*To all whom it may concern:*

Be it known that I, JOHN V. SCHMID, a citizen of the United States, and a resident of Wyndmoor, in the county of Montgomery and State of Pennsylvania, have invented certain new and useful Improvements in Valves, of which the following is a specification, reference being had to the accompanying drawings.
This invention particularly relates to non-return or check-valves of the class designed to prevent chattering or hammering of the valve disk upon its seat, due to the rapid intermittent pressure upon said disk.
Valves of this class are usually provided with a dash-pot, comprising a cylinder and piston having its movable member connected to be shifted in accordance with the movement of the valve disk, and the bearing surfaces of said cylinder and piston have relatively different areas. In practice, the stroke or rise of the valve disk varies and normally is but a small fraction of the full stroke of said disk, and consequently, that portion of the bearing surface of the dash-pot members, which is less frequently traversed, is subject to the usual deposits due to the metallic contact with the steam, water, or other fluid, and said deposits thus collected prevent the free movement of the dash-pot members, and consequently hamper the free operation of the valve disk. Furthermore, as the relative movement of the dash-pot members is principally within a limited range, the region of the longer member which is mostly traversed by the shorter member, becomes worn, and shoulders are thus formed which prevent the free relative movement of said dash-pot members, eventually causing the valve disk to chatter and hammer on its seat.

It is the principal object of this invention to obviate the difficulties above set forth, and to provide such a valve, with a valve disk connected with the dash-pot, so constructed as to permit the valve disk to respond to very small differences in pressure upon its opposite sides and to prevent any deposits of solid material collecting upon the bearing surfaces of the cylinder and piston, and to prevent the wearing of said surfaces in zones.

Further objects of this invention are to provide an auxiliary valve stem normally disconnected from the valve disk, arranged to control its movement, to provide removable means to prevent the rotation of said auxiliary valve stem, and to provide a dash-pot of such construction as to be readily adapted to an ordinary valve.

The form of this invention hereinafter described, provides a valve casing comprising a removable bonnet having the usual stuffing box, with a valve seat; a valve disk coöperative with said seat to control said valve, and provided with a stem; a dash-pot comprising a cylinder removably fitted in said casing, and having a piston secured to said valve stem; an auxiliary valve stem extending through the packing in said stuffing box, and arranged to reciprocate to engage and disengage said valve stem within said casing, and provided with a threaded region exterior to said casing, and having a recess providing a flat surface; a detachable bearing on said bonnet; a hand wheel having a hub mounted to rotate in said bearing, in threaded engagement with said auxiliary valve stem; and a block loosely retained in a socket in said bonnet, in engagement with the flat recess on said auxiliary valve stem, and arranged to prevent the relative rotation of said auxiliary valve stem with respect to said casing, whereby the rotation of said hand wheel effects the reciprocation of said auxiliary stem relative to said valve stem.

This invention also includes the various novel features of construction and arrangement hereinafter more definitely specified.

In the accompanying drawings, Figure 1 is a vertical longitudinal sectional view of a valve comprising a convenient embodiment of this invention; Fig. 2 is a plan sectional view of said valve taken on the line 2—2 of Fig. 1; Fig. 3 is a plan view of the valve casing and the parts included therein, the bonnet being removed.

In said figures, the casing 5 is provided with the inlet 6, and outlet 7, which are arranged to be controlled by the valve disk 8 arranged to engage the seat 9, which is in threaded engagement with the valve casing 5, and includes the spider 10, having the guide bearing 11 for the stem extension 12, depending from said valve disk 8. Said valve disk 8 is provided with the upwardly extending stem 14 which is provided with the piston 15 secured thereon by the nut 16 in threaded engagement with said stem 14.

The piston 15 has its opposite curved or circular edges 17 sharpened and is mounted for reciprocation in the cylinder 18 whose bearing surface 19 is substantially coextensive with the bearing surface 20 of said piston, so that as said piston returns to its normal position its bearing surface wipes over and covers the entire bearing surface of the cylinder and any deposit thereon is scraped off by the sharpened edge of said piston. Thus it will be seen that it is impossible for the bearing surfaces of either the cylinder or piston to corrode or be otherwise effected by deposits; but, on the contrary, said surfaces are maintained free by the constant wiping action of the relative movement of said piston. Said cylinder 18, is closed at its lower end to form the closed chamber 21, and is provided with the outwardly extending flange 22 which is seated in the recess 23 in the upper face of the casing 5 and retained therein by the bonnet 24, secured to said casing by the bolts 25. Said bonnet 24 is provided with the stuffing box 26 inclosing the packing 27, which is adjusted by the gland 28 and said bonnet carries the yoke frame 30 having the flanged pad 31 provided with the aperture 32, and the recess 33 at one side of said aperture. The yoke frame 30 carries the bearing 34 which is secured to said pad 31 by the bolts 35, and said bearing retains the hub 36 of the hand wheel 37 in rotatable relation with said frame 30, said wheel and hub being rigidly secured together by the nut 38.

The valve may be manually controlled by the reciprocatory auxiliary valve stem 40, which has a threaded portion 41 in threaded engagement with the hub 36 and said auxiliary stem is provided with the longitudinal recess 42 having a flat surface against which the removable block or key 43 bears. Said block 43 is arranged to prevent the rotation of said stem 40, and is loosely mounted in the recess 33 in the yoke frame 30.

The auxiliary valve stem 40 extends through the stuffing box 26, and is provided with the head 47, which is arranged to engage the seat 48, to prevent leakage around said stem when said valve is operative, and said head may be shifted downwardly by rotation of the hand wheel 37, to engage the upper end of the valve stem 14, and thereby retain the valve disk 8 upon its seat 9 to prevent the passage of fluid through the inlet and outlet connections of the valve. The extent of movement of the valve disk 8 may also be regulated by the auxiliary valve stem 40, which may be shifted to limit its maximum stroke.

It may be observed that owing to the different coefficient of expansion of the valve casing and the dash-pot cylinder, it is desirable to provide for their relative expansion and contraction, and therefore, the dash-pot cylinder 18, as shown in Fig. 1, of the drawing, is formed slightly smaller than the casing walls which inclose it.

The valve herein described is particularly adapted for use in connection with a battery of boilers wherein each boiler is provided with such a valve and connected with the inlet thereof, the outlet of said valve being connected to a header common to the outlets of the valves of each boiler, and so arranged that when one of the boilers in the battery becomes disabled or the pressure therein falls below the pressure of the other boilers, the valve of the disabled or tardy boiler will automatically close and prevent the pressure from the other boilers of the battery from entering said disabled boiler. Said header is usually connected with an engine or other pressure consuming device, and therefore it will be seen that the pressure will be constantly varying therein, which will tend to intermittently open and close the valve disk 8, and as said valve disk is alternately raised and lowered, the air or other fluid within the dash-pot will be shifted to the opposite sides of the piston 15, escaping between the bearing surfaces 19 and 20 of said piston 15 and cylinder 18 respectively.

In order to prevent trapping of condensate in the dash-pot, the central web of the piston 15 is provided with a pin hole 50 and the bottom wall of the cylinder 18 is provided with the pin hole 51 whereby if any condensation is effected within the dash-pot the condensate thus produced is permitted to escape therefrom into the valve casing 5.

It is not desired to limit this invention to the precise details of construction and arrangement herein set forth, as it is obvious that various modifications may be made therein without departing from the essential features of the invention as defined in the appended claims.

Having thus described my invention, I claim:

1. A valve having cushioning means to prevent its rapid opening and closing, comprising relatively movable members each having bearing surfaces, which are included between oppositely directed free edges, and which are substantially coextensive, and longer than their relative movement.

2. A valve controlled by a dash-pot comprising relatively movable members each having bearing surfaces included between oppositely directed free edges, which are spaced apart in excess of the length of the valve stroke, and normally register.

3. In a valve, the combination with a valve disk arranged to control said valve, of cushioning means for said disk having relatively movable members whose bearing surfaces each terminate in oppositely disposed free edges, and are substantially coextensive, and of greater length than the maximum stroke of said disk.

4. In a valve, the combination with a valve disk arranged to control said valve, of a dash-pot connected with said disk and having relatively movable members whose bearing surfaces each terminate in oppositely directed free edges, and are substantially coextensive, and remain in contact irrespective of the position of said disk.

5. In a valve, the combination with controlling means, of cushioning means for preventing the rapid actuation of said controlling means, and comprising relatively movable members whose bearing surfaces each terminate in oppositely directed free edges, and are maintained in contact, irrespective of the movement of said controlling means, and are normally substantially coextensive.

6. In a valve, the combination with means to control the passage of fluid therethrough, of a dash-pot comprising a cylinder having a bearing surface disposed between free edges, of a piston connected with said controlling means, and having a bearing surface whose opposite edges respectively register with the opposite edges of the bearing surface of said cylinder, when said controlling means is in a position to close said valve, and means preventing the disengagement of the said surfaces, irrespective of the controlling means.

7. In a valve, the combination with a valve disk arranged to control said valve, of a dash-pot comprising a cylinder mounted in said valve, forming an inclosed chamber and having a bearing surface terminating in oppositely directed free edges, a piston connected with said valve disk and having a bearing surface in constant engagement with the bearing surface in said cylinder, the opposite edges of which normally register with the opposite free edges of the bearing surface of said cylinder, when said valve disk is in a position to close said valve.

8. In a valve, the combination with a valve disk arranged to automatically control said valve and comprising a stem terminating within said valve, a relatively movable auxiliary valve stem arranged to engage the stem on said valve disk to control the movement of said disk, means to reciprocate said auxiliary stem, a dash-pot comprising a cylinder having a bearing surface of greater length than the maximum movement of said valve disk and terminating in oppositely disposed free edges, a piston on said valve stem having a bearing surface whose opposite edges normally register with the opposite edges of the bearing surface in said cylinder.

9. In a valve comprising a seat, the combination with a valve disk coöperative with said seat to control the passage of fluid therethrough, and having a stem terminating within said casing, an auxiliary valve stem coöperative with the stem on said valve disk to control said valve disk, and extending exterior to said casing, and having a threaded portion, and a recess providing a plane surface joining the cylindrical wall of said stem, a block exterior to the valve chamber removably fitted within said recess and engaging said plane surface to prevent rotation of said auxiliary stem, and a hand wheel comprising a hub in threaded engagement with said auxiliary stem arranged for relative rotation therewith to reciprocate said auxiliary stem with respect to said valve stem.

10. In a valve, the combination with a valve disk arranged to automatically control the passage of fluid through said valve, of a dash-pot comprising a cylinder and piston, said piston being connected with said valve disk, and having curved sharpened edges which are uninterrupted, and spaced substantially coincident with the edges of the bearing surface of said cylinder when said valve disk is in position to close said valve.

11. A valve comprising a seat, a valve disk coöperative with said seat to control the passage through said valve, and having a stem, a dash-pot within the valve closure, having an open and a closed end, and comprising a cylindrical bearing surface and a recessed portion adjacent to its closed end, said bearing surface being included between the open edge and the edge formed by said recess, and a piston connected with said stem, and fitted to slide in said dash-pot and to engage the entire cylindrical surface upon each movement to its normal position.

12. A valve, comprising a seat, a valve disk coöperative with said seat to control said valve, and having a stem terminating within the valve closure, a yoke carried by said valve, and comprising a bearing and having a recess in its top face, an auxiliary stem coöperative with the stem of said valve disk to control the movement of said disk, and having a recessed threaded portion extending through said bearing, a hand wheel mounted in said bearing, operative to engage with the threads on said auxiliary stem to reciprocate said stem, and a block mounted in said bearing and engaging with the recesses in said auxiliary stem to prevent rotation of the latter.

13. A valve, comprising a seat, a valve disk coöperative with said seat to control said valve, and having a stem extended therefrom and terminating within the valve closure, a dash-pot within said inclosure, a piston carried by said valve stem, and having its bearing surface normally coöperative with the bearing surface of the dash-pot, a yoke carried by said valve having a stuffing box, and a bearing, an auxiliary stem extended through said stuffing box, and having a recessed threaded portion forming a flattened surface, a hand wheel mounted to rotate in said bearing, and operative to engage the threads of said auxiliary stem to reciprocate the latter through said stuffing box, to control the movement of said valve disk, and means carried by said bearing, coöperative with and extending transversely of, and beyond the flattened surface of said auxiliary stem to prevent rotation of said auxiliary stem.

14. A valve comprising a seat, a disk coöperative with said seat to control the passage through said valve, and having a stem, a dash-pot within the valve closure, having an open and a closed end and comprising a cylindrical bearing surface terminating in an annular recess adjacent to said closed end, and a piston connected with said valve stem and fitted to slide in said dash-pot, and having its inner edge coincident with the edge formed by said recess when the valve disk is in closed position upon its seat.

In witness whereof I have hereunto set my hand, this tenth day of May, A. D. 1910.

JOHN V. SCHMID.

Witnesses:
ALEXANDER PARK,
CLIFTON C. HALLOWELL.